United States Patent [19]
Uchida et al.

[11] Patent Number: 6,147,469
[45] Date of Patent: Nov. 14, 2000

[54] COMMUNICATION METHOD FOR MACHINE CONTROLLER

[75] Inventors: Hiroyuki Uchida; Shunsuke Matsubara; Yuuichi Yamada, all of Minamitsuru-gun, Japan

[73] Assignee: Fanuc Ltd., Yamanashi, Japan

[21] Appl. No.: 09/180,569

[22] PCT Filed: Mar. 10, 1998

[86] PCT No.: PCT/JP98/00983

§ 371 Date: Nov. 10, 1998

§ 102(e) Date: Nov. 10, 1998

[87] PCT Pub. No.: WO98/40798

PCT Pub. Date: Sep. 17, 1998

[30] Foreign Application Priority Data

Mar. 10, 1997 [JP] Japan ............................ 9-070901

[51] Int. Cl.[7] .................... G05B 19/414; H04B 10/24
[52] U.S. Cl. ..................... 318/675; 318/16; 318/625; 318/480
[58] Field of Search ............... 318/16, 560, 600, 318/625, 671, 675, 34, 480

[56] References Cited

U.S. PATENT DOCUMENTS

| | | | |
|---|---|---|---|
| 4,792,995 | 12/1988 | Harding | 359/144 |
| 4,819,273 | 4/1989 | Gordon | 359/144 |
| 5,819,008 | 10/1998 | Asama et al. | 395/90 |

FOREIGN PATENT DOCUMENTS

| | | |
|---|---|---|
| 62-182804 | 8/1987 | Japan . |
| 3-500938 | 2/1991 | Japan . |
| 3-116406 | 12/1991 | Japan . |
| 5-197646 | 8/1993 | Japan . |
| 6-170061 | 6/1994 | Japan . |
| 7222489 | 8/1995 | Japan . |
| 8214564 | 8/1996 | Japan . |
| 8-321840 | 12/1996 | Japan . |
| 9106307 | 4/1997 | Japan . |

*Primary Examiner*—Bentsu Ro
*Attorney, Agent, or Firm*—Staas & Halsey LLP

[57] ABSTRACT

A communication apparatus and method provides communication in a controller of an industrial machine which is not affected by disconnection of cables, external electrical noise, nor complicated lead-around cable work. Communication between a numerical control device, as a main control unit, and servo amplifiers, as drive control units servo motors of a machine tool, is performed by way of infrared communication. The communication may take the form of input/output voltage commands, i.e. PWM commands, and feedback signals. By way of the infrared communication, lead-around cable operation, disconnection, and external electrical noises are eliminated, while simplifying machine tool layout design.

12 Claims, 8 Drawing Sheets ated Mar. 10, 1998.

COMMUNICATION METHOD FOR MACHINE CONTROLLER

This application is a National Stage of International Application PCT/JP98/00983 under 35 USC §371, filed Mar. 10, 1998.

TECHNICAL FIELD

The present invention relates to an improvement of a communication method in a controller of a machine.

BACKGROUND ART

A telecommunication cable or an optical cable has been used in communication between a numerical control device or the like as a main control unit and an interface device, and between a numerical control device or the like and a servo amplifier or the like as a drive control unit. In using either cable, a lead-around work of cables is troublesome and may cause disconnection thereof, and in particular the telecommunication cable may pick up an external electrical noise which may cause an abnormality in communication data.

SUMMARY OF THE INVENTION

It is an object of the present invention to provide a communication method for a controller of a machine which is not affected by disconnection of cables and electrical external noises nor requires any complicated lead-around work of cables.

According to an aspect of the present invention, a communication method in a controller of a machine includes steps of: providing infrared communication interfaces on a main control unit and a drive control unit; and performing infrared communication between the main control unit and the drive control unit through the infrared communication interfaces.

Further, an infrared communication interface may be provided on an interface device for connecting the main control unit and a peripheral device, to thereby perform infrared communication between the main control unit and the interface device.

According to another aspect the invention, a communication method in a controller of a machine includes the steps of: providing infrared communication interfaces on a main control unit and a plurality of drive control units; and performing infrared communication between the main control unit and the plurality of drive control units through the infrared communication interfaces. In this case, the plurality of drive control units are connected to each other in series so that the infrared communication can be performed in a daisy chain between the main control unit and the plurality of drive control units.

The machine controlled by the control device includes a machine tool, a robot, an injection molding machine and a press machine.

BEST MODE OF CARRYING OUT THE INVENTION

Figure 1:
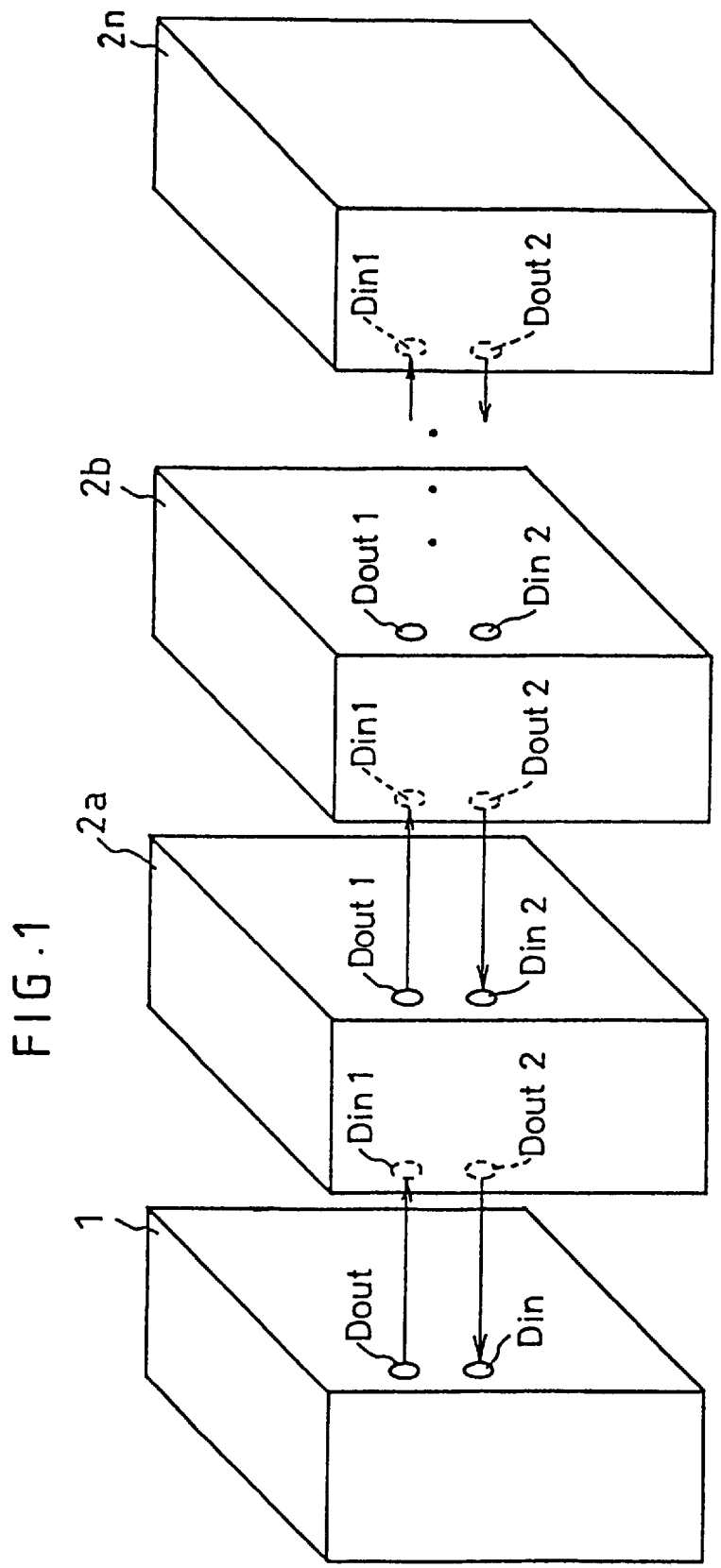
FIG. 1 is an illustration showing an arrangement in which an communication method of the present invention is applied to communication between a numerical control device as a main control unit and servo amplifiers as drive control units for driving motors based on a command from the numerical control device.

FIG. 1 shows an embodiment of a communication method of the present invention being applied to communication between a numerical control device 1 serving as a main control unit and servo amplifiers 2a, 2b, . . . , 2n serving as drive control units for driving servo motors for respective axes based on a command from the numerical control device 1.

The numerical control device 1 has a basic function equivalent to a conventional one, that is, the numerical control device 1 sends a command of position, velocity or voltage (PWM command) and the like for the servo motors of the respective axes in each predetermined period and receives feedback signals of position, velocity and current and the like from the servo motors for the respective axes in the predetermined period. The servo amplifiers 2a, 2b, . . . , 2n for the respective axes have basic functions equivalent to conventional ones, that is, they drivingly control the servo motors for the respective axes in response to the position, velocity or current command and the like from the numerical control device 1 and return the feedback signals of position, velocity and current or the like to the numerical control device 1 based on data from a pulse coder and a current amplifier or the like provided in each of the servo motors for the respective axes.

In the arrangement shown in FIG. 1, each of the numerical control device 1 and the servo amplifiers 2a, 2b, . . . , 2n for the respective axes is provided with a light emitting portion and a light receiving portion for infrared communication as means for performing the infrared communication according to the invention.

As shown in FIG. 1, the numerical control device 1 has an infrared output section Dout for outputting a position, velocity or current command or the like to the servo motors for the respective axes and an infrared input section Din for receiving feedback signals of position, velocity, current and the like from the servo amplifiers 2a, 2b, . . . for the respective axes. Each of the servo amplifiers 2a, 2b, . . . for the respective axes has an infrared input section Din1 for receiving the position, velocity or current command and the like from the numerical control device 1, an infrared output section Dout1 for outputting the position, velocity or current command and the like received from the numerical control device 1 to next servo amplifier 2b, 2c, . . . (i.e., in the right direction in FIG. 1), an infrared input section Din2 for receiving the feedback signals from the servo amplifier 2b, 2c, . . . for each axis and an infrared output section Dout2 for outputting the feedback signals received from the servo amplifier 2b, 2c, . . . for each axis or its own feedback signals to the next servo amplifier 2a, 2b, . . . (i.e., in the left direction in FIG. 1).

Thus, each of the servo amplifiers 2a, 2b, . . . has a function of transmitting the position, velocity or current command and the like received from the numerical control device 1 to an adjacent servo amplifier 2b, 2c, . . . (i.e., in the right direction in FIG. 1) or transmitting the feedback signals received from the servo amplifier 2b, 2c, . . . to an adjacent servo amplifier 2a, 2b, . . . (i.e., in the left direction in FIG. 1).

Although the terminal servo amplifier 2n does not need the infrared output section Dout1 and the infrared input section Din2, it is necessary to locate the servo amplifier 2n at the termination of a string of servo amplifiers in the case where the terminal servo amplifier 2n has no infrared output section Dout1.

Figure 2:
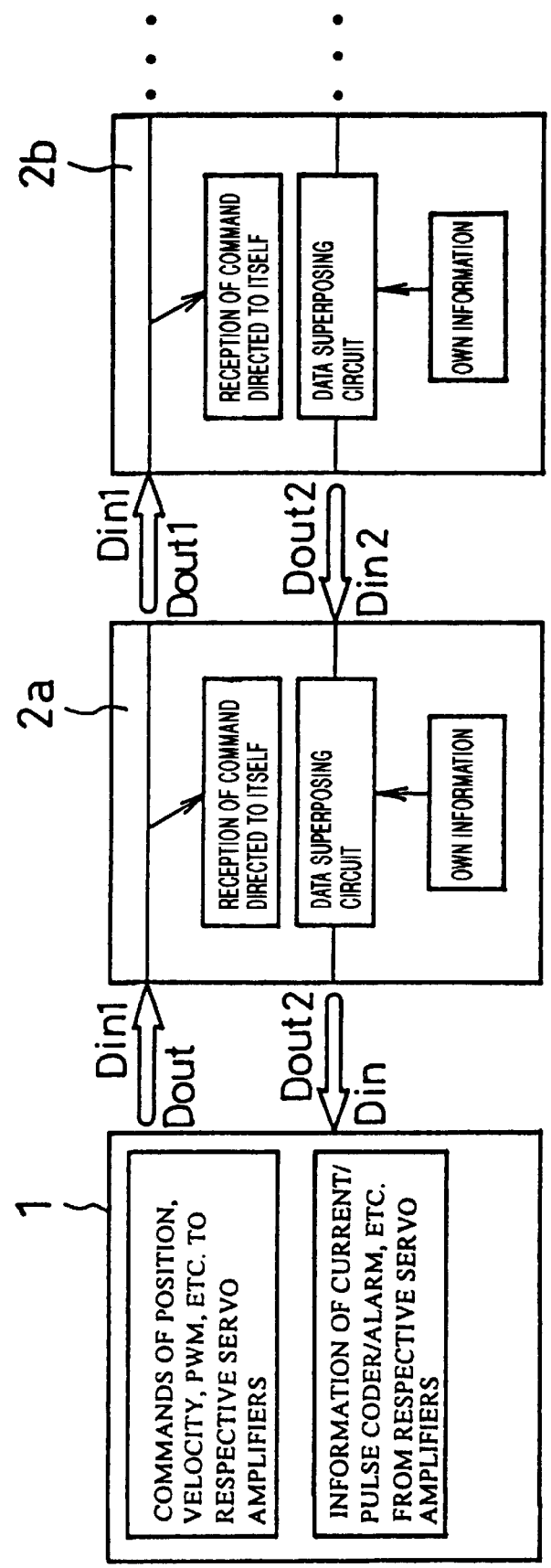
FIG. 2 is a functional block diagram showing infrared communication between the numerical control device and the servo amplifiers for respective axes based on the arrangement shown in FIG. 1.

FIG. 2 is a functional block diagram showing infrared communication between the numerical control device 1 and the servo amplifiers 2a, 2b, . . . , 2n servings as drive control units for the respective axes.

The numerical control device 1 has a serial transfer control circuit for converting numerical control information including the position, velocity or current command and the like for the respective servo motors into serial data. The position, velocity or current command for the respective axes is converted from parallel data into serial data and outputted through a bus in every distribution period of a motion command by an internal processing of the numerical control device 1. The output is an infrared signal from the numerical control device 1 through the infrared output section Dout.

This serial data identifies each servo amplifier 2a, 2b, . . . , 2n to which the motion command, etc are to be outputted depending on a storage location of each data (see Japanese Patent Laid-open Publication No. 10-13394). Otherwise, an ID (identifier) may be used for identification.

The infrared signal representing the position, velocity or current command outputted from the numerical control device 1 through the infrared output section Dout is firstly received by the servo amplifier 2a through the infrared input section Din1, and the servo amplifier 2a transfers this signal as it is through the infrared output section Dout1 to the next servo amplifier 2b (i.e., in the right direction in FIG. 2). Subsequently, each of the servo amplifiers 2b, 2c, . . . , 2n-1 repeatedly performs the same processing, and as a result, the infrared signal representing the motion command and the like is transferred up to the terminal servo amplifier 2n. The servo amplifier 2n, having a terminal detector, only receives the signal through the infrared input section Din1 and outputs no signal through the infrared output section Dout1.

Each of the servo amplifiers 2a, 2b, . . . , 2n reads the position, velocity or current command or the like directed to oneself among the commands received through the infrared input section Din1 and drivingly controls the servo motor for its axis in the conventional manner.

Each servo amplifier converts an integrated value of the position, velocity or like feedback signals stored in a register of each servo amplifier in a period from the last processing to the present processing and data of a drive current value or the like detected in a period from the last processing to the present processing into serial data, and transfers the serial data through its infrared output section Dout2 to the next servo amplifier (i.e., in the left direction in FIG. 2). This infrared signal is received by the next servo amplifier through its infrared input section Din2, and this next servo amplifier superposes its own feedback information on the received infrared signal in a predetermined order and outputs the resultant signal through its infrared output section Dout2. Subsequently, the processing similar to the above is repeatedly performed, and as a result, the feedback signal from each servo amplifier finally enters into the numerical control device 1 through the infrared input section Din.

Figure 3:
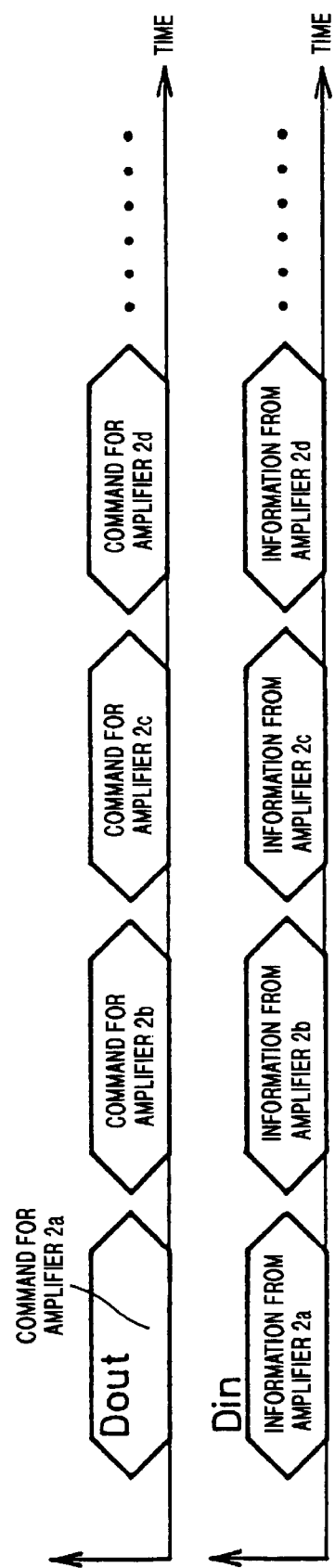
FIG. 3 is a timing chart showing a state of infrared communication between the numerical control device and the servo amplifiers for respective axes in time series based on the arrangement shown in FIG. 1.

FIG. 3 is a timing chart showing communication between the numerical control device 1 for drivingly controlling servo motors for four axes and the servo amplifiers 2a–2d for the respective axes in time series in a system constituted by the numerical control device 1 and the servo amplifiers 2a–2d for the respective axes.

The numerical control device 1 transmits the position, velocity or current command and the like for these four axes in the order of the servo amplifiers 2a, 2b, 2c and 2d, and also receives the feedback information in the order of the servo amplifiers 2a, 2b, 2c and 2d.

While the description has been given on an example in which a plurality of servo amplifiers 2a, 2b, . . . , 2n serving as the drive control units are connected to the numerical control device 1 in a daisy chain, the aforementioned infrared communication can be applied to communication between an interface device for interconnecting various peripheral devices and the numerical control device 1. The arrangement in this case is substantially similar to the above. However, since the interface device and the peripheral devices are connected via a telecommunication cable or an optical cable in general, the interface device itself does not need sections corresponding to the infrared output section Dout1 and the infrared input section Din2 for connecting adjacent devices.

Figure 4:
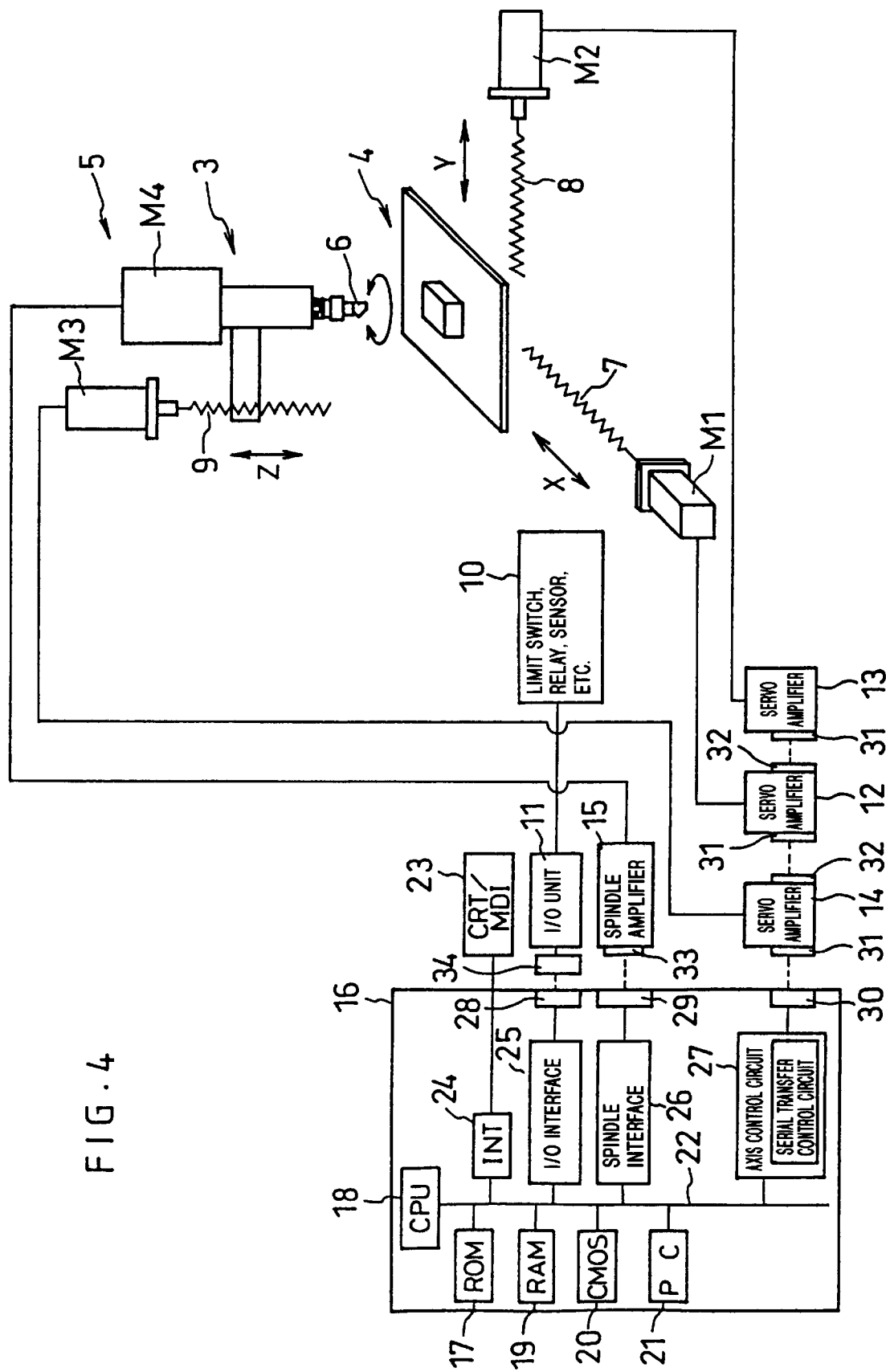
FIG. 4 is a schematic block diagram showing an embodiment in which a communication method of present invention is applied to a machine tool such as a milling machine.

FIG. 4 is a schematic block diagram showing an embodiment in which the communication method of the invention is applied to a machine tool 3 such as a milling machine.

The machine tool 3 has servo motors M1 and M2 for feeding a table 4 in X- and Y-axis directions and a servo motor M3 for feeding a machining head 5 in a Z-axis direction, and the machining head 5 has a spindle motor M4 for rotating a spindle on which a tool 6 is mounted. Incidentally, reference numerals 7, 8 and 9 denote a feed screw mechanism (a ball nut and a ball screw, etc.) serving as a feeding means for each axis. A peripheral device 10 comprising a limit switch or a sensor for detecting a limit position of each axis and various relays and the like is mounted in the periphery of the machine tool 3 or on its operation panel, and is connected to an I/O unit 11 serving as an interface device via a telecommunication cable or an optical cable. Servo motors M1, M2 and M3 for the X, Y and Z axes are respectively connected to servo amplifiers 12, 13 and 14 as drive control units for the respective axes, and the spindle motor M4 is connected to a spindle amplifier 15 as a drive control unit therefor.

A numerical control device 16 serving as a main control unit of the machine tool 3 has a microprocessor 18, a ROM 17 storing a system program and the like, a non-volatile memory 20 storing various application programs and the like, a RAM 19 for use in temporary storage of results of arithmetic processing, etc. and a programmable controller 21 for sequence control, and these components are interconnected via a bus 22 so as to enable transmission of information. A manual data input unit 23 with a display serving as an interface between the numerical control device 16 and an operator is connected to the bus 22 via a dedicated interface circuit 24.

Each of an interface circuit 25 for the I/O unit 11, a spindle interface 26 for the spindle amplifier 15 and an axis control circuit 27 for performing position, velocity and current loop processing for the servo amplifiers 12, 13 and 14 has an infrared emitting section and an infrared receiving section which are respectively equivalent to the infrared emitting section Dout and the infrared receiving section Din shown in FIGS. 1 and 2.

Thus, the interface circuit 25 has an infrared input/output section 28 composed of an infrared output section Dout' and an infrared input section Din' respectively equivalent to the infrared output section Dout and the infrared input section Din shown in FIGS. 1 and 2. The spindle interface 26 has an infrared input/output section 29 comprising an infrared output section Dout" and an infrared input section Din". The axis control circuit 27 has an infrared input/output section 30 comprising an infrared output section Dout''' and an infrared input section Din'''.

Further, the servo amplifiers 14, 12 and 13 are respectively equivalent to the servo amplifiers 2a, 2b and 2n shown in FIGS. 1 to 3, and each of the servo amplifiers 14, 12 and 13 has an infrared input section Din1', an infrared output section Dout1', an infrared input section Din2' and an infrared output section Dout2' respectively equivalent to the infrared input section Din1, the infrared output section Dout1, the infrared input section Din2 and the infrared output section Dout 2 of each of the servo amplifiers 2a, 2b and 2n, and transmits information on a voltage command (PWM command) and its feedback signal or the like to or from the infrared input/output section 30 of the numerical control device 16. As a matter of course, the terminal servo amplifier 13 does not need the infrared output section Dout1' and the infrared input section Din2'.

In FIG. 4, an infrared input/output section 31 comprising an infrared input section Din1' and an infrared output section Dout2' and an infrared input/output section 32 comprising an infrared output section Dout1' and an infrared input section Din2' are shown in a simplified form.

Similarly to the above, the spindle amplifier 15 has an infrared input/output section 33 comprising infrared input and output sections Din1" and Dout2" for transmitting information to or from the infrared input/output section 29 of the spindle interface 26, and the I/O unit 11 has an infrared input/output section 34 comprising infrared input and output sections Din1''' and Dout2''' for transmitting information to or from the infrared input/output section 28 of the interface circuit 25. Since there is no need of connecting more amplifiers to the spindle amplifier 15 in series nor connecting more I/O units to the I/O unit 11 in series, the spindle amplifier 15 and the I/O unit 11 have no infrared input/output section equivalent to the infrared input/output section 32 of each of the servo amplifiers 14 and 12.

Figure 8:
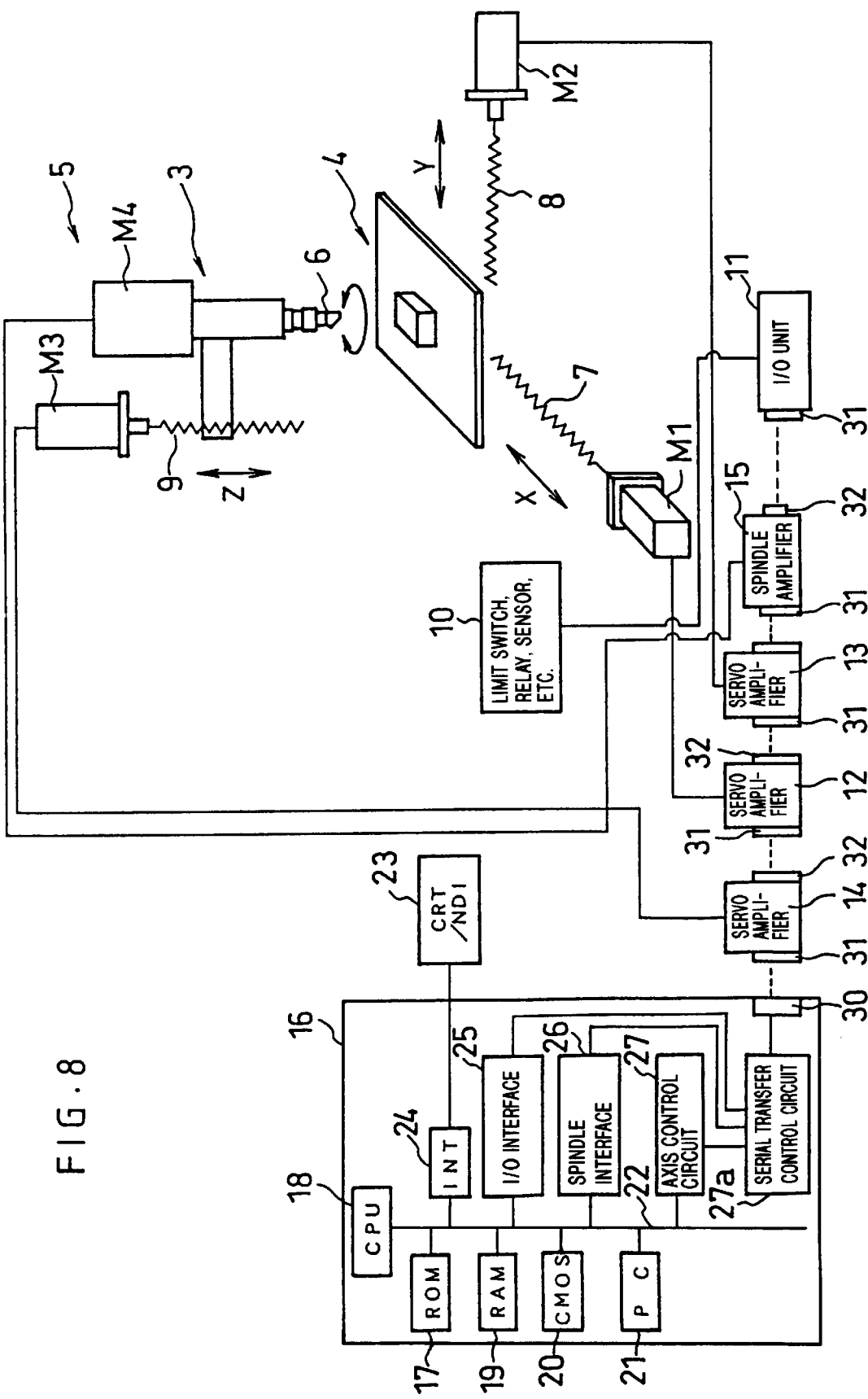
FIG. 8 is a schematic block diagram showing an embodiment in which a communication method of the present invention is applied to a machine tool such as a milling machine.

Further, as shown in FIG. 8, the spindle amplifier 15 and the I/O unit 11 may be interconnected by an optical link (infrared communication in a daisy chain) together with the servo amplifiers 14, 12 and 13 serving as drive control units. In the arrangement shown in FIG. 8, the axis control circuit 27 is separated from a serial transfer control circuit 27a, and the I/O interface 25, the spindle interface 26, the axis control circuit 27 and the serial transfer control circuit 27a are connected together, whereby a signal outputted from the interfaces 25 and 26 and the axis control circuit 27 is converted into a serial signal which is outputted through the infrared input/output section 30, or the feedback signal outputted from the servo amplifiers 14, 12 and 13, the spindle amplifier 15 and the I/O unit 11 is converted into a parallel signal which is outputted to the axis control circuit 27 and the interfaces 25 and 26.

As described referring to FIGS. 1 to 3, in a communication between the numerical control device 16 and the servo amplifiers 14, 12 and 13 connected in series, each of the servo amplifiers 14, 12 and 13 transfers the signal representing the current command and the position and velocity feedback signals to or from the numerical control device 16 in a daisy chain, while in a communication between the numerical control device 16 and the spindle amplifier 15 or the I/O unit 11 which does not require data transfer to any other device, each of the spindle amplifier 15 and the I/O unit 11 transfers the signal to or from the numerical control device 16 which is always connected with the numerical control device 16.

Figure 5:
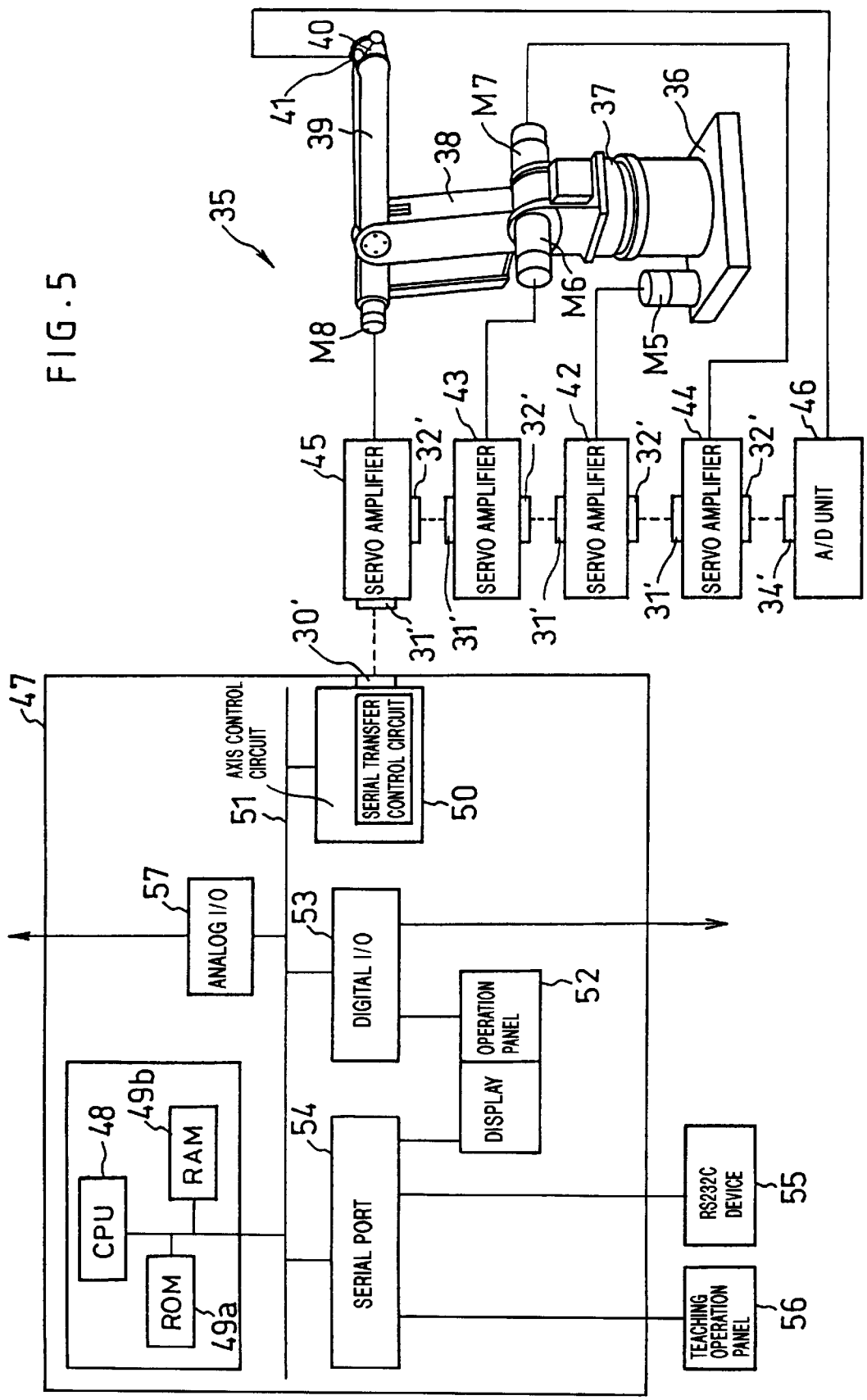
FIG. 5 is a schematic block diagram showing an embodiment in which a communication method of a present invention is applied to an articulated industrial robot.

FIG. 5 is a schematic block diagram showing an embodiment in which the communication method of the invention is applied to an articulated industrial robot.

An industrial robot 35 is constituted by a base 36 for fixing the robot 35 to a floor, a swivel drum 37 making a turning action on the base 36, a first arm 38 pivotally attached to the swivel drum 37 and making a swing action within a vertical plane, a second arm 39 pivotally attached to the end of the first arm 38 and making a swing action within a vertical plane and a wrist 40 mounted on the end of the second arm 39. The wrist 40 is provided with a peripheral device 41 such as a torque sensor or a pressure sensor to detect a force to hold an article with an attachment or the like, or an acceleration sensor available to detect an accelerating or decelerating state or a moving velocity of the robot end.

M5 denotes a servo motor for turning the swivel drum 37, M6 and M7 are respectively servo motors for swinging the first and second arms 38 and 39, and M8 is a servo motor for driving the wrist 40, wherein these servo motors have individually a pulse coder and are connected respectively to servo amplifiers 42, 43, 44 and 45 serving as drive control units of the servo motors. Further, the peripheral device 41 such as a sensor is connected to an A/D unit 46, which is an interface device for converting analog data into digital data, via a telecommunication cable, an optical cable or the like. This A/D unit 46 has a parallel-to-serial conversion function, in addition to an analog-to digital conversion function.

A numerical control device 47 serving as a main control unit of the industrial robot 35 has a microprocessor 48, a ROM 49a storing a system program or the like, a RAM 49b for temporary storage of results of arithmetic processing and the like and an axis control circuit 50 with a built-in serial transfer control circuit, and these components are interconnected via a bus 51 to enable the transmission of information.

A manual data input unit 52 with a display serving as an interface between the numerical control device 47 and the operator comprises an operation panel portion including operating means such as a keyboard and a touch panel, and a display portion including a liquid crystal panel, a CRT or the like. The operation panel portion is connected to the bus 51 through a digital input/output circuit 53, while the display portion is connected to the bus 51 through a serial port 54.

Further, a teaching operation panel 56 operable remotely from the numerical control device 47 by cable connection is connected to the serial port 54, and a peripheral device 55 meeting standard requirements of RS232C, e.g., a drive of an external storage device can be connected to the serial port 54. Furthermore, other peripheral devices can be connected to the numerical control device 47 via a digital input/output circuit 53 or an analog input/output circuit 57. The teaching operation panel 56 also serves as an interface between the numerical control device 47 and the operator.

In this embodiment, data is transmitted in the form of an infrared signal between the axis control circuit 50 of the numerical control device 47 and the servo amplifiers 45, 43, 42 and 44 and the A/D unit 46.

An infrared input/output section 30' of the axis control circuit 50 has a structure equivalent to the infrared input/output section 30 of the servo interface 27 shown in FIG. 4, and infrared input/output sections 31' and 32' of each of the servo amplifiers 45, 43, 42 and 44 also have structures equivalent to the infrared input/output sections 31, 32 of each of the servo amplifiers 14 and 12 shown in FIG. 4.

Further, an infrared input/output section 34' of the A/D unit 46 is also equivalent in structure to the infrared input/output section 34 of the I/O unit 11 shown in FIG. 4.

This embodiment is different from the embodiment shown in FIG. 4 in that the axis control circuit (reference numeral 27 in FIG. 4) for the servo amplifiers and the communication interface (reference numeral 25 in FIG. 4) for the interface device are integrated together into the axis control circuit 50, instead of providing these two kinds of communication interfaces on the side of the numerical control device 47.

According to the present embodiment, in addition to the servo amplifiers 45, 43, 42 and 44, the A/D unit 46 serving as the interface device for the device on the side of the robot 35 needs to be connected to the string of servo amplifiers in a daisy chain so as to make communication to or from the axis control circuit 50 for both of the servo amplifiers and the interface device (see FIG. 5).

While the infrared communication between the axis control circuit 50 and the servo amplifiers 45, 43, 42 and 44 is processed basically in the similar manner to that shown in FIG. 3, a communication between the A/D unit 46 and the axis control circuit 50 becomes necessary in this embodiment, and therefore, a location for transmission and reception of information between the axis control circuit 50 and the A/D unit 46 is added to transmission/reception data on condition that the A/D unit 46 is reckoned among the devices equivalent to the servo amplifiers 45, 43, 42 and 44.

Figure 6:
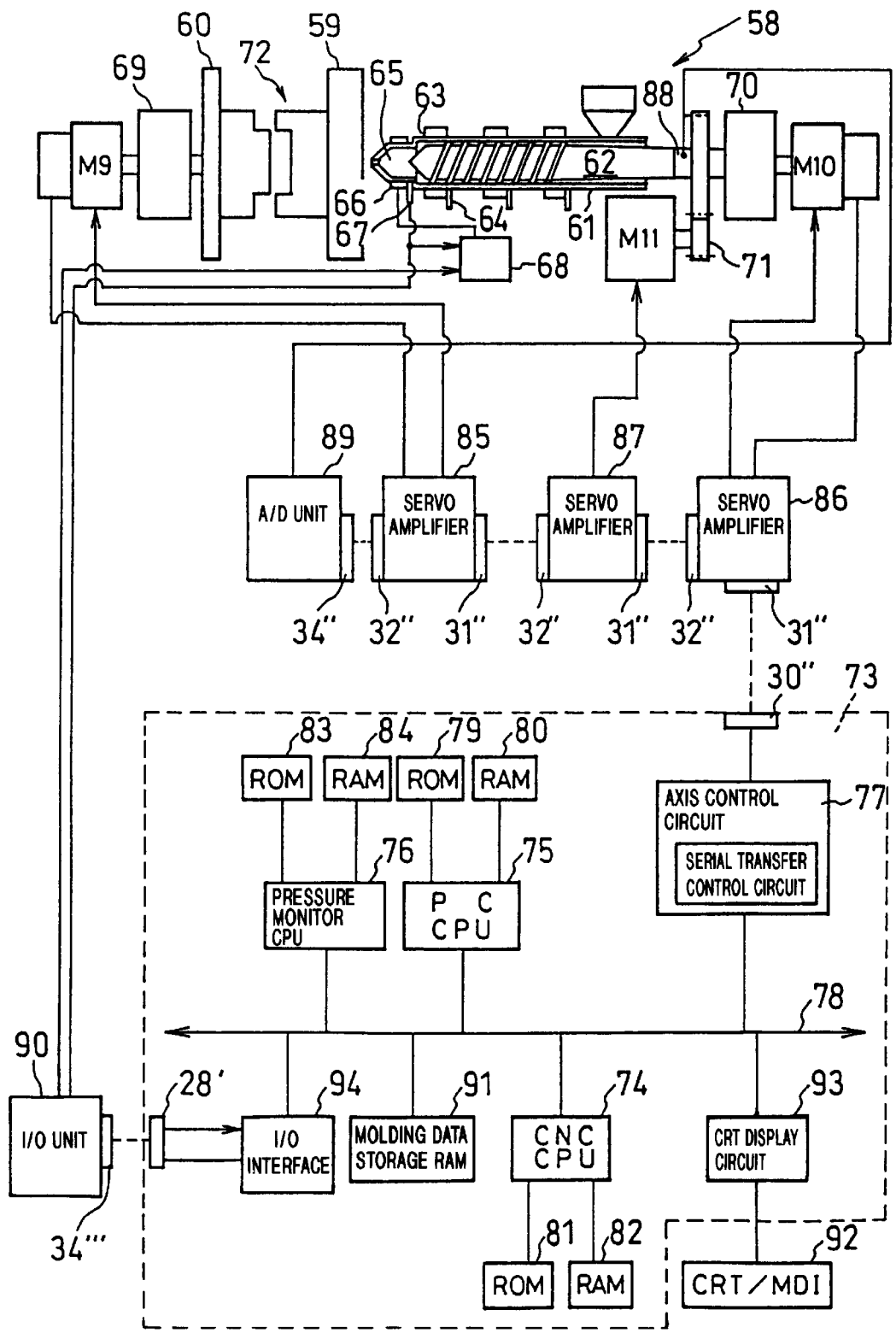
FIG. 6 is a schematic block diagram showing an embodiment in which the communication method of the invention is applied to an injection molding machine.

FIG. 6 is a schematic block diagram showing an embodiment in which the communication method of the invention is applied to an injection molding machine 58.

In FIG. 6, reference numeral 59 denotes a stationary platen, 60 denotes a movable platen, 61 denotes an injection cylinder and 62 denotes a screw. The injection cylinder 61 is provided with a band heater 63 and a thermocouple 64 serving as temperature detection means. A plurality of band heaters 63 and thermocouples 64 are provided in pairs in parallel to an axial direction of injection so as to control individually the temperature of each part of the injection cylinder 61. Further, a nozzle 65 at the end of the injection cylinder 61 is provided with a nozzle heater 66 and a thermocouple 67 similarly to the above.

While a temperature controller 68 for PID (proportion, integration and differentiation) control of the temperature of the nozzle heater 66 in the nozzle 65 is only shown in FIG. 6, more temperature controllers similar to the above are also equipped individually for the band heaters 63 and the thermocouples 64 in the respective parts of the injection cylinder 61.

The movable platen 60 is moved by an output of a servo motor M9 for clamping along a tie bar (not shown) through a drive converting device 69 composed of a ball nut and screw, a toggle mechanism or the like. Further, the screw 62 is moved in an axial direction thereof by a drive converting device 70 composed of a ball nut and screw and a boss and serration or the like and a servo motor M10 for injection, and is rotated for measuring and kneading by a drive mechanism composed of a gear mechanism 71 and a servo motor M11 for measuring rotation, independently of the axial movement.

While the servo motor M9 for clamping, the servo motor M10 for injection and the servo motor M11 for measuring revolution are connected respectively to servo amplifiers 85, 86 and 87 serving as drive control units of these motors, the servo motor M9 for clamping and the servo motor M10 for injection among these servo motors need position feedback control, whereas the servo motor M11 for measuring revolution does not always need the position feedback control.

Further, an output from a pressure detector 88 provided on a base portion of the screw 62 for detecting injection pressure, holding pressure and back pressure is transmitted to an A/D unit 89 serving as an interface device via a telecommunication cable, an optical cable or the like, and a temperature detection signal line from the thermocouple 67 and each thermocouple 64 and a signal line connected to a temperature control input terminal of the temperature adjuster 68 are connected to an I/O unit 90 serving as another interface device.

The servo amplifiers 86, 87 and 85 are substantially similar in arrangement to the servo amplifiers 45, 43, 42 and 44 shown in FIG. 5, and the A/D unit 89 is substantially similar in arrangement to the A/D unit 46 shown in FIG. 5. Further, the I/O unit 90 is substantially similar in arrangement to the I/O unit 11 shown in FIG. 4. That is, each of the servo amplifiers 86, 87 and 85 has infrared input/output sections 31" and 32" equivalent to the infrared input/output sections 31' and 32' shown in FIG. 5, the A/D unit 89 has an infrared input/output section 34" equivalent to the infrared input/output section 34' shown in FIG. 5, and the I/O unit 90 has an infrared input/output section 34'" equivalent to the infrared input/output section 34 shown in FIG. 4.

A reference numeral 72 denotes a mold mounted between the stationary platen 59 and the movable platen 60.

A numerical control device 73 serving as a main control unit of the injection molding machine 58 has a CPU 74 for CNC serving as a microprocessor for numerical control, a CPU 75 for PC serving as a microprocessor for a programmable controller, a CPU 76 for a pressure monitor for sampling the injection holding pressure or the screw back pressure and an axis control circuit 77 with a built-in serial transfer control circuit, and is configured to transmit information among the microprocessors by determining selectively input/output of these microprocessors relative to each other via a bus 78.

The axis control circuit 77 is substantially similar in structure to the axis control circuit 50 shown in FIG. 5 and has an infrared input/output section 30" equivalent to the infrared input/output section 30' shown in FIG. 5. This axis control circuit 77 transmits a voltage command (PWM command), feedback information or the like to or from the servo amplifiers 86, 87 and 85 through the infrared input/output section 30" and also reads data from the pressure detector 88 through the A/D unit 89 connected to the terminal servo amplifier in the string of servo amplifiers. The A/D unit 89 serves as one of devices connected to the string of servo amplifiers in a daisy chain. That is, also in this embodiment, the communication interface (reference numeral 27 in FIG. 4) for the servo amplifiers and the communication interface (reference numeral 25 shown in FIG. 4) for the interface device are integrated together into the axis control device 77, instead of providing these two kinds of communication interfaces on the side of the numerical control device 73.

The CPU 75 for PC is connected to a ROM 79 storing a sequence program or the like for controlling a sequence operation of the injection molding machine and a RAM 80 for use in temporary storage of processing data, and the CPU 74 for CNC is connected to a ROM 81 storing a program or the like for generally controlling the injection molding machine and a RAM 82 for use in temporary storage of processing data and so on. Further, the CPU 76 for the pressure monitor is connected to a ROM 83 storing a control program related to sampling or the like of pressure data and a RAM 84 for use in temporary storage of data.

A non-volatile memory 91 serves as a memory for storage of molding data such as molding conditions (injection holding pressure conditions, metering conditions and the temperature of the nozzle 65 and each part of the injection cylinder 62 and so on) and various set values related to the injection molding operation, parameters and macro variables or the like.

A manual data input unit 92 with a display is connected to a bus 78 through a CRT display circuit 93, so as to display various set frames and input data or the like through various function keys, numeral keys and cursor move keys or the like.

Further, reference numeral 94 denotes an I/O interface with a built-in serial transfer control circuit and has an infrared input/output section 28' for transferring a temperature control signal and a current temperature feedback signal to or from the infrared input/output section 34''' of the IO unit 90 described above. The infrared input/output section 28' is substantially equivalent in structure to the infrared input/output section 28 shown in FIG. 4. Since input/output of data related to temperature control or the like of the cylinder 61 is performed by the CPU 75 for PC (which will be described later), and the I/O interface 94 is dedicated to the CPU 75 for PC, the I/O interface 94 is provided independently of the axis control circuit 77 dedicated to the CPU 74 for CNC as described above.

The CPU 75 for PC controls a sequence of each axis of the injection molding machine, while the CPU 74 for CNC distributes a motion command to the servo motors for the respective axes on the basis of the control program in the ROM 81. As described in the example of the industrial robot 35 referring to FIG. 5, the servo amplifiers 86, 87 and 85 for the respective axes and the A/D unit 89 transfer various commands and feedback information or the like to or from the axis control circuit 77 every predetermined period, in addition to transfer of pressure data detected by the pressure detector 88.

Further, the control of the temperature in each part of the injection cylinder 61 and the nozzle 65 with the band heater 63 and the nozzle heater 66 is realized by means of PID feedback control with each temperature controller 68 in the conventional manner on the basis of the relation between each part's actual temperature fed back from the thermocouples 64 and 67 through the I/O unit 90 and the I/O interface 94 and a target temperature set in the non-volatile memory 91 by the CPU 75 for PC through the I/O interface 94 and the I/O unit 90 every temperature controller 68.

Figure 7:
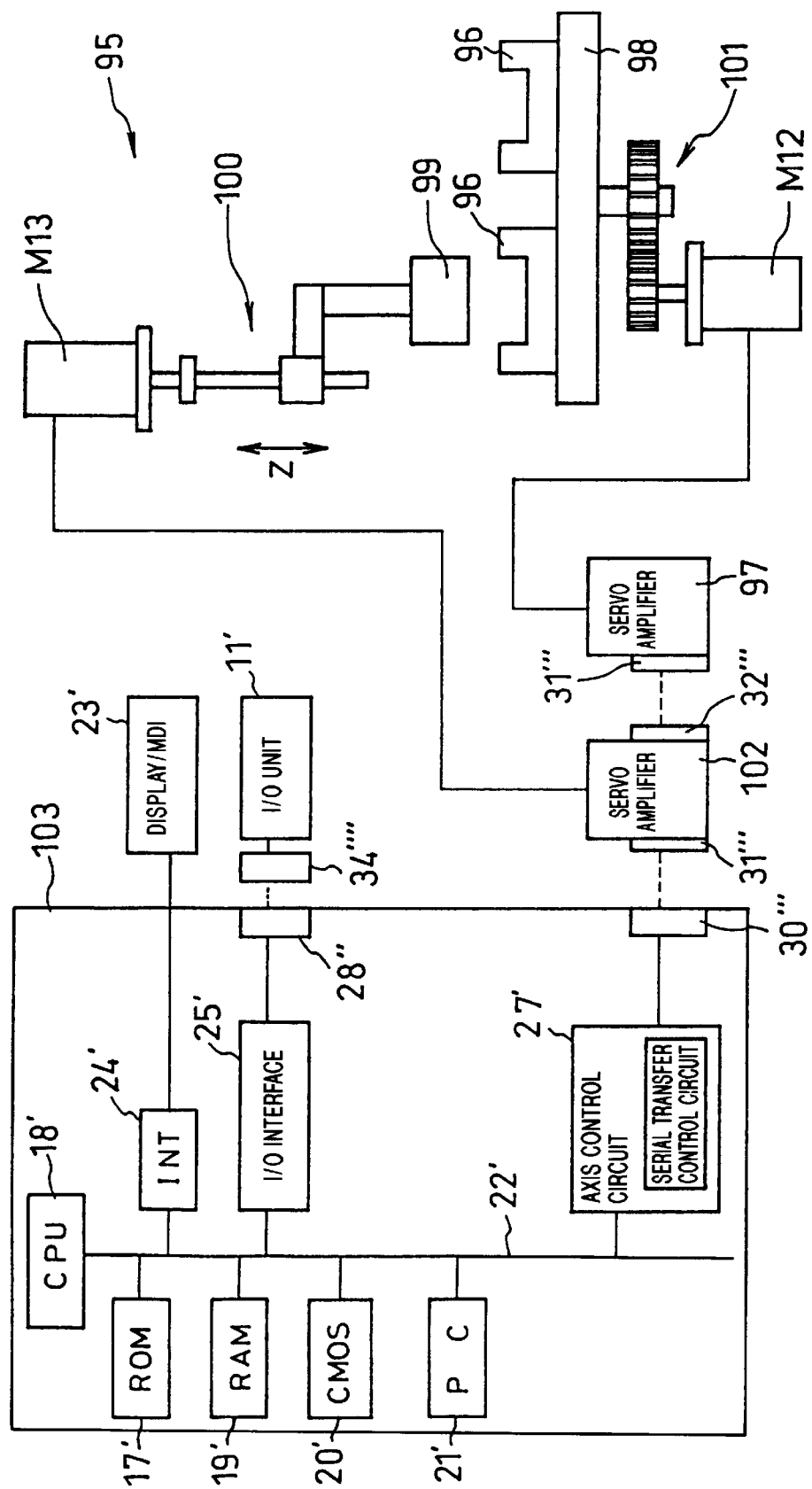
FIG. 7 is a schematic block diagram showing an embodiment in which the communication method of the invention is applied to a press machine.

FIG. 7 is a block diagram of an essential portion showing an embodiment in which the communication method of the invention is applied to a press machine 95.

An essential part of the press machine 95 comprises a rotary table 98 for mounting a die set 96 or the like and a vertical feeding mechanism 100 for mounting a punch 99, and the rotary table 98 is driven to rotate by a servo motor M12 through a rotary table mechanism 101 comprising a combination of spur gears, while the punch 99 is driven vertically by a servo motor M13 through a vertical feeding mechanism 100 comprising a ball nut and screw or the like.

Thus, a rotary table 98 of two or three stage type is employed for mounting a plurality of die sets 96, and the rotary table 98 is rotated so as to load materials into the die sets 96 and take out products from the die sets 96 by an industrial robot or the like, while performing a press machining by vertically moving the punch 99 in another stage in cooperation with the rotation of the rotary table.

The servo motors M12 and M13 are connected respectively to servo amplifiers 97 and 102 serving as drive control units of these motors. The servo amplifier 102 is similar in structure to the servo amplifiers 12, 14 shown in FIG. 4, and the servo amplifier 97 is similar in structure to the servo amplifier 13 shown in FIG. 4. A reference numeral 31''' denotes an infrared input/output section equivalent to the infrared input/output section 31 shown in FIG. 4, and 32''' denotes an infrared input/output section equivalent to the infrared input/output section 32 shown in FIG. 4.

A numerical control device 103 serving as a main control unit of the press 95 is substantially similar in structure to the numerical control device 16 shown in FIG. 4. However, since the press machine 95 does not need any spindle motor, there is no component equivalent to the spindle interface 26 shown in FIG. 4. A reference numeral 30''' denotes an infrared input/output section equivalent to the infrared input/output section 30 shown in FIG. 4, 28'' denotes an infrared input/output section equivalent to the infrared input/output section 30 shown in FIG. 4, and 34'''' denotes an infrared input/output section equivalent to the infrared input/output section 34 shown in FIG. 4. Other components equivalent to those shown in FIG. 4 are denoted by the same reference numerals with a dash ('), and the description thereof will be omitted.

According to the communication method for a controller of a machine of the present invention, since an infrared signal is employed for communication between a main control unit and a drive control unit or communication between the main control unit and an interface device, any complicated lead-around work of cables becomes unnecessary, and any abnormal communication does not occur due to disconnection or external electrical noise, differently from the conventional communication utilizing a telecommunication cable or an optical cable. Further, since the devices are arranged such as to face their infrared input/output sections each other, the degree of freedom in arrangement of various devices is increased and a layout design of the system is easily achieved.

What is claimed is:

1. A control system to control a machine, comprising:
   a machine having a plurality of motors to control a machining operation;
   a plurality of drive control units respectively corresponding to each of the motors, wherein said drive control units control the respective motors through respective electrical connections, said drive control units each having respective infrared communication interfaces to transmit information among the plurality of drive control units through a daisy chain; and a main control unit housing a numerical control device to generate numerical control information to control said plurality of drive control units, said main control unit having an infrared communication interface connected to the daisy chain, wherein the numerical control information is transmitted from the infrared communication interface of said main control unit to corresponding infrared communication interfaces of said plurality of drive control units through the daisy chain to respectively control each of said motors.

2. The control system according to claim 1, wherein each of the motors is a servo motor and each of said drive control units includes a servo amplifiers.

3. The control system according to claim 1, wherein said machine comprises a machine tool.

4. The control system according to claim 1, wherein said machine comprises a robot.

5. The control system according to claim 1, wherein said machine comprises an injection molding machine.

6. The control system according to claim 1, wherein said machine comprises a press machine.

7. A communication method in a controller of a machine having a main control unit and a plurality of serially connected drive control units, the drive control units serving to control motors of the machine based on a command from said main control unit, said method comprising the steps of:

(a) providing infrared communication interfaces on said main control unit and said plurality of drive control units; and (b) performing an infrared communication between said main control unit and said plurality of drive control units in a daisy chain through said infrared communication interfaces to thereby control the motors through the infrared communication.

8. The communication method according to claim 7, wherein said controller further has an interface device for connecting said main control unit with a peripheral device, said step (a) further including a step of providing an infrared communication interface on said interface device, and said step (b) further including a step of performing an infrared communication between said main control unit and said interface device through said infrared communication interface.

9. The communication method according to claim 7, wherein said machine comprises a machine tool.

10. The communication method according to claim 7, wherein said machine comprises a robot.

11. The communication method according to claim 7, wherein said machine comprises an injection molding machine.

12. The communication method according to claim 7, wherein said machine comprises a press machine.

* * * * *